UNITED STATES PATENT OFFICE.

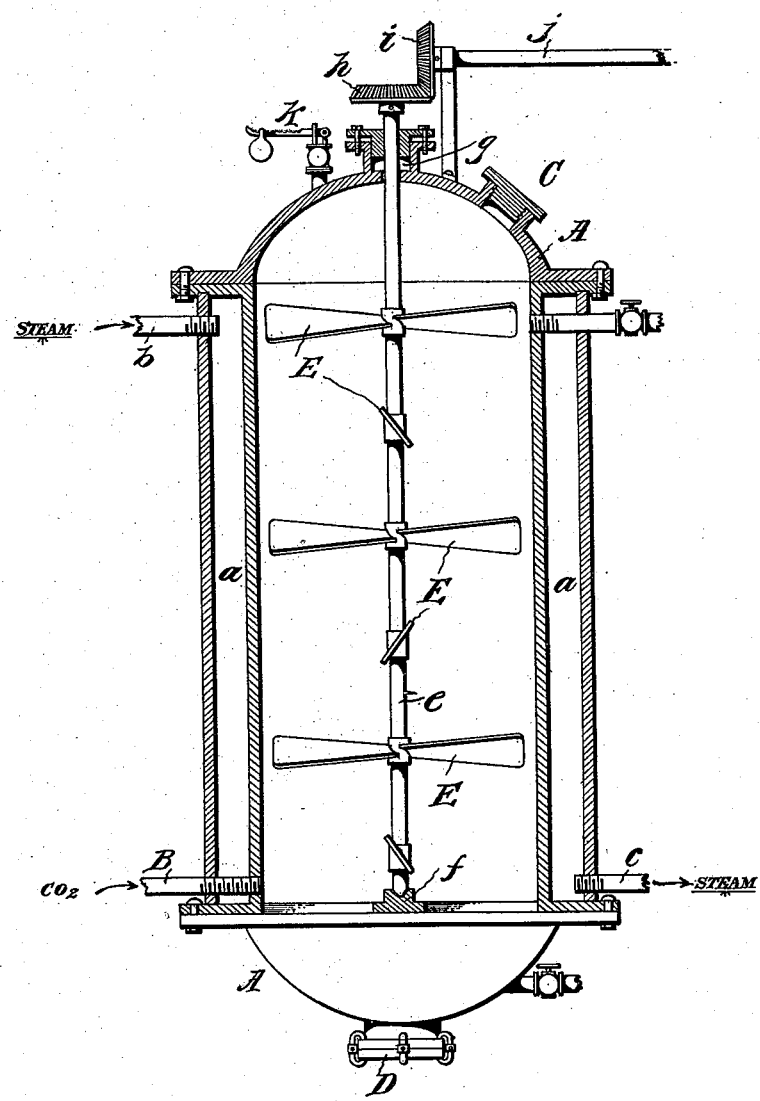

CARL HOEPFNER, OF FRANKFORT-ON-THE-MAIN, GERMANY.

PROCESS OF RECOVERING ZINC.

SPECIFICATION forming part of Letters Patent No. 664,269, dated December 18, 1900.

Application filed November 18, 1897. Serial No. 658,995. (No specimens.)

*To all whom it may concern:*

Be it known that I, CARL HOEPFNER, residing at Frankfort-on-the-Main, in the German Empire, have invented certain new and useful Improvements in Processes for the Recovery of Zinc, (for which Letters Patent have been obtained in England, dated June 16, 1894, No. 11,724, and March 18, 1895, No. 5,662, and in Germany, dated February 14, 1895, No. 85,812, certificate of addition issued March 7, 1896, No. 86,153;) and I do hereby declare the following to be a full, clear, and exact description of the invention, such as will enable others skilled in the art to which it appertains to make and use the same.

This invention has for its object a process for economically obtaining zinc chlorid from its carbonate (natural or artificial) or from materials containing the same, and more particularly from calamin containing zinc carbonate, as also from other materials containing artificial carbonate of zinc, or which when brought into contact with carbon dioxid may be considered as converted into carbonate.

The drawing illustrates a suitable vessel A, provided with a steam or hot-water jacket $a$ and with inlets and outlets $b$ and $c$, a carbonic-acid supply B, to be preferably under pressure, an ore and solution feed C, and an ore and solution outlet D, and means for agitating and mixing, comprising a series of revoluble blades E, mounted on a vertical spindle $e$, stepped in a suitable support $f$ near the bottom of the vessel, the upper end passing through a stuffing-box $g$ and carrying a bevel-gear $h$, driven by a second gear $i$ on a driving or line shaft $j$. A relief-valve $k$ allows the escape of the air that has been forced in with the carbonic-acid gas.

In carrying out my invention I mix with the zinc carbonate or pulverized calamin a suitably-concentrated solution of calcium chlorid above normal temperature and under pressure, preferably in a closed vessel. The necessary pressure above atmospheric pressure may be obtained either through the pressure of the column of liquid itself or in a closed vessel by means of any suitable gas, preferably carbonic-acid gas or a mixture of this gas and air, whereby the zinc carbonate is converted into chlorid by the simultaneous action of carbonic acid and calcium chlorid and dissolved and leached out, the calcium chlorid in the solution being in part replaced by zinc chlorid, $(ZnCl_2,)$ the reaction taking place in accordance with the following equation:

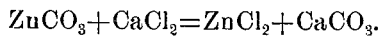
$$ZnCO_3 + CaCl_2 = ZnCl_2 + CaCO_3.$$

The solution of zinc chlorid may then be enriched by the known method—*i. e.*, by the so-called "methodical extraction" or causing the solution to flow in a direction opposite to the travel of the ore, then purified, and the zinc in a pure form extracted by electrolysis in the presence of insoluble anodes. Pure zinc will be deposited at the cathode and chlorin liberated at the anode, which chlorin can be utilized in the manufacture of chlorate of potash or bleaching-powder or for any other purpose. As it is not always practicable to electrically decompose all of the zinc chlorid in the solutions so obtained I may treat a portion thereof or a portion partly freed from zinc electrolytically with hydrated lime, $Ca(OH)_2$, whereby I obtain zinc hydroxid, $Zn(OH)_2$, which I may electrolyze, preferably, by means of the process described in Patent No. 629,685, granted to me July 25, 1899.

In the described process of extraction I can use the cheap calcium-chlorid solutions obtained in the manufacture of ammonia soda or of chlorate of potash, as neither common salt nor potassium compounds in the solution to be electrolyzed will detrimentally influence the electrolytic action.

To avoid the loss of material quantities of solution in the exhausted raw materials or ores, they are washed or leached with water or weak or partly-exhausted solutions and then enriched methodically. These weak solutions are preferably concentrated and the steam generated utilized as a motive power or for other industrial purposes. By these means the sodium chlorid (common salt) and the potassium compounds in the solution are recuperated for use either in solid form or in solution.

In the extraction of zinc from carbonate of zinc, particularly from calamin or roasted blende in contact with carbon dioxid $(CO_2)$ I may make use of solutions of carnallite containing potassium and magnesium chlorids or other solutions of magnesium chlorid to which hydrated lime, Ca(OH)$_2$, may be added, thereby producing CaCl$_2$ and Mg(OH)$_2$, which is eliminated from the solution, while the KCl contained therein when carnallite is employed may be made available for the manufacture of chlorate of potash. When artificial carbonate of zinc is the primary material, the process is carried out in the same manner as described in respect of calamin. This carbonate can be obtained from zinciferous materials by reacting upon finely-divided zinc oxid either free or in a basic solution with carbonic acid. Thus, for instance, zinc-blende containing zinc sulfid is roasted to convert the sulfid into oxid. The roasted ores are then treated with a solution of calcium chlorid and carbonic acid while being stirred and subjected to a temperature and pressure above the normal.

Having thus described my invention, what I claim as new therein, and desire to secure by Letters Patent, is—

1. The process, which consists in acting upon zinc oxid or a material containing it, with a solution of calcium chlorid at a temperature above normal and a pressure above atmospheric, and precipitating the zinc as a hydroxid, substantially as described.

2. The process, which consists in reacting upon zinc carbonate or a material containing it, with a solution of calcium chlorid under a temperature above normal and a pressure above atmospheric, and recovering the zinc from the solution, substantially as described.

3. The process, which consists in reacting upon zinc oxid or a material containing it, with carbonic acid and a solution of calcium chlorid, at a temperature above normal and a pressure above atmospheric, and recovering the zinc from the solution, substantially as described.

4. The process, which consists in reacting upon zinc carbonate or a material containing it, with a solution of calcium chlorid at a temperature above normal and a pressure above atmospheric, recovering zinc from the solution so formed and concentrating the latter, for the purpose set forth.

5. The process, which consists in reacting upon zinc carbonate or a material containing it, with a solution of calcium chlorid at a temperature above normal and a pressure above atmospheric, precipitating from the solution so obtained a portion of the zinc as a hydroxid by means of a suitable precipitant, recovering the zinc therefrom, and returning the solution into the cycle of operations, substantially as described.

6. The process, which consists in reacting upon zinc oxid or a material containing it, with carbonic acid and a solution of calcium chlorid at a temperature above normal and a pressure above atmospheric, precipitating a portion of the zinc as hydroxid with a suitable precipitant, as lime, removing the precipitated zinc hydroxid, and using the regenerated calcium-chlorid solution in the treatment of more raw material, substantially as set forth.

7. The process which consists in reacting upon zinc carbonate or a material containing it, with a solution of calcium chlorid at a temperature above normal and a pressure above atmospheric, recovering a portion of the zinc electrolytically and the remaining zinc as a hydroxid by means of lime, concentrating the solution and returning it into the cycle of operations, substantially as described.

In testimony that I claim the foregoing as my invention I have signed my name in presence of two subscribing witnesses.

CARL HOEPFNER.

Witnesses:
HENRY ORTH, Jr.,
HENRY ORTH.